United States Patent [19]

Wightman

[11] Patent Number: 4,591,692
[45] Date of Patent: May 27, 1986

[54] BATTERY WARMER

[76] Inventor: Lawrance W. Wightman, Ridgecreek, St. Louis, Mo. 63141

[21] Appl. No.: 538,522

[22] Filed: Oct. 3, 1983

[51] Int. Cl.$^4$ .............................................. H05B 1/00
[52] U.S. Cl. .................................... 219/209; 219/202; 219/504; 219/521
[58] Field of Search ............... 219/209, 202, 504, 505, 219/345, 311, 205, 208, 535, 521; 24/17 R, 17 A, 23 B, 198, 200

[56] References Cited

U.S. PATENT DOCUMENTS

| | | | |
|---|---|---|---|
| 984,867 | 2/1911 | Tirrill | 24/17 A |
| 2,626,971 | 1/1953 | Mansoff | 219/209 |
| 3,156,813 | 11/1964 | Trainor | 219/345 |
| 3,564,199 | 2/1971 | Blaha | 219/505 |
| 3,940,591 | 2/1976 | Ting | 219/505 |
| 4,037,082 | 7/1977 | Tamada | 219/505 |
| 4,313,048 | 1/1982 | Holbrook | 219/311 |
| 4,314,144 | 2/1982 | Wojtecki | 219/345 |

FOREIGN PATENT DOCUMENTS

| | | | |
|---|---|---|---|
| 3022034 | 12/1981 | Fed. Rep. of Germany | 219/504 |
| 1285042 | 8/1972 | United Kingdom | 219/535 |
| 1347702 | 2/1974 | United Kingdom | 219/311 |

Primary Examiner—Clifford C. Shaw
Assistant Examiner—Teresa J. Walberg
Attorney, Agent, or Firm—Polster, Polster and Lucchesi

[57] ABSTRACT

A battery warmer includes a positive temperature coefficient (PTC) element of a size to maintain the contents of a battery to which it is attached in the range of 45° to 100° F. in ambient temperatures of −30° to 75° F., and a housing for the PTC element, preferably of foamed plastic. The housing is mounted to a flat side of the battery, either adhesively or mechanically. A method of making the warmer includes securing paper to two broad, parallel surfaces of the housing to provide one surface that will take adhesive and another to bear printed instructions, and which together inhibit warping of the housing during its manufacture.

2 Claims, 9 Drawing Figures

BATTERY WARMER

BACKGROUND OF THE INVENTION

In many climates it is desirable to have a means for keeping an automobile battery warm during very cold weather, and in some climates it is absolutely essential. Various heating devices have been used, but most have been either complicated or else required careful watching.

One of the objects of this invention is to provide a battery warmer that is simple, safe, easy to install, highly convenient to use, and economical both in manufacture and in use.

Other objects will become apparent to those skilled in the art in the light of the following description and accompanying drawing.

SUMMARY OF THE INVENTION

In accordance with this invention, generally stated, a battery warmer is provided with a PTC (positive temperature coefficient) element of a character to maintain the contents of an electric battery to which it is attached in the range of 45° to 100° F. in ambient temperatures of −30° to 75° F. The element is attached in heat-transfer relation to the battery, and provided with means for connecting it to an external source of electric power. In the preferred embodiment, the PTC element is seated in a housing in the form of a molded block of polyurethane foam with a flat, substantially uninterrupted bottom surface, a top surface with a heater-receiving cavity or well, the upper edges of which are defined by a plate-receiving recess framed by a flat faced upper surface raised with respect to the plate-receiving recess, and side surfaces extending from the edges of the bottom surface to the outer margins of the top surface. One of the side surfaces or the bottom has a conductor-receiving passage in it. A bottom sheet of paper (the term paper is used herein as meaning a material with little or no stretch) is secured to and covers the bottom surface. A top sheet of paper is secured to and covers the top surface of the block around the well. A PTC heater is mounted in the well. A metal plate, connected in heat-transfer relation to the heater is mounted in the plate-receiving recess over the part of the top sheet within the recess, and extends in substantially flush relation to the upper surface of the housing.

In making the battery warmer, a mold is provided with a mold cavity in the form of a shallow truncated pyramid with sides flaring outwardly to an open top. A core lid, adapted to fit on the mold to cover the cavity has a heater well core, a plate-receiving recess core surrounding the well core and a flat area surrounding the plate-receiving recess core, all within the ambit of the mold cavity when the lid is mounted on the mold. The inside surface of the mold cavity is coated with release material, such as silicone. A bottom sheet of paper is laid in the mold to cover the bottom. The heater well core is coated with release material and a top sheet of paper, with an opening in it to accommodate closely the heater well core is mounted around the heater well core. The top sheet is of a size to cover the remainder of the part of the core lid within the ambit of the mold cavity. Uncured polyurethane material mixed with intumescing agent is placed in the mold cavity, the lid is put on and the material is confined as it intumesces until it sets, whereby the top and bottom sheets of paper are molded and bonded to a resultant molded block of polyurethane foam. A plate of a size to fit closely within the plate-receiving recess is assembled to a PTC heater of a size to fit within the heater-receiving well in the block, a conductor from the PTC heater is led through a passage in the wall or bottom of the block, and the plate and heater are mounted in the block, as by bringing the plate into contact with adhesive on the top sheet of paper in one embodiment in which the warmer is mounted mechanically, as by a strap, or by means of an upper sheet of adhesive which serves the triple function of holding the plate in position, providing a moisture seal, and mounting the warmer to the side of the battery in another embodiment.

DESCRIPTION OF THE PREFERRED EMBODIMENTS

Figure 1:
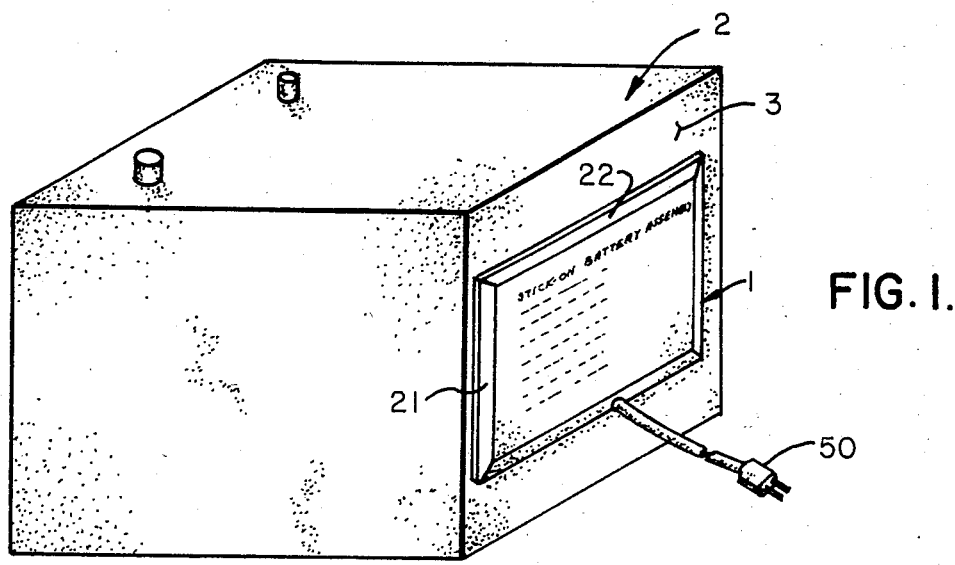
FIG. 1 is a view in perspective of an automobile battery with a heater of one embodiment of this invention mounted upon it.

Referring now to the drawings, particularly FIGS. 1 through 4, reference numeral 1 indicates a battery warmer of this invention which, in FIG. 1, is mounted adhesively against a flat side 3 of a battery 2.

The warmer 1 includes a housing body 7, and a heating assembly 8. The body is rectangular in plan and has a flat bottom surface 20, covered by a bottom sheet 11 of paper, which in this embodiment is foil and bears printed instructions 16 on its outer surface, short side surfaces 21 and long side surfaces 22, one of which, in this embodiment, has a conductor-receiving through passage 24 through it. The sheet 11 is molded onto and bonded to the bottom surface 20. The body has a well 25 in it, symmetrically arranged with respect to top and bottom surfaces, defined by a bottom 26 and a side wall 27 which flares outwardly upwardly and opens through a bottom surface 29 of a shallow plate-receiving recess 28 in the upper surface of the body. The recess is defined by the bottom 29 and side wall 30. The top surface 31 is planar and extends between the upper edges of the side wall 30 and the side surfaces 21 and 22. The bottom surface 29 of the recess 28 and the top surface 31 are covered by a top sheet of paper 12 (in this embodiment, Nomex, a Mylar) molded in place and bonded to the surfaces. The side wall 30 is of a height to accommodate the top sheet 12 and a plate 52 to permit an upper surface of the plate to lie flush with a top surface 31 of the body.

Figure 2:
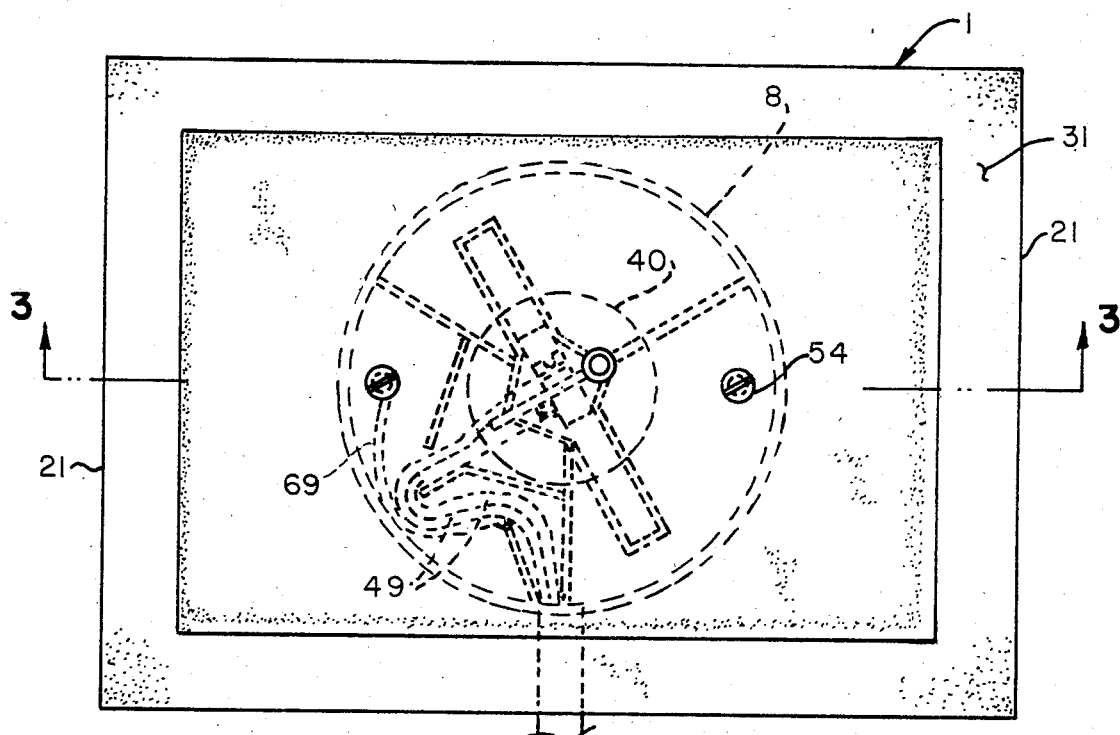
FIG. 2 is a top plan view of one embodiment of heater of this invention, with interior parts shown in broken lines.
Figure 3:
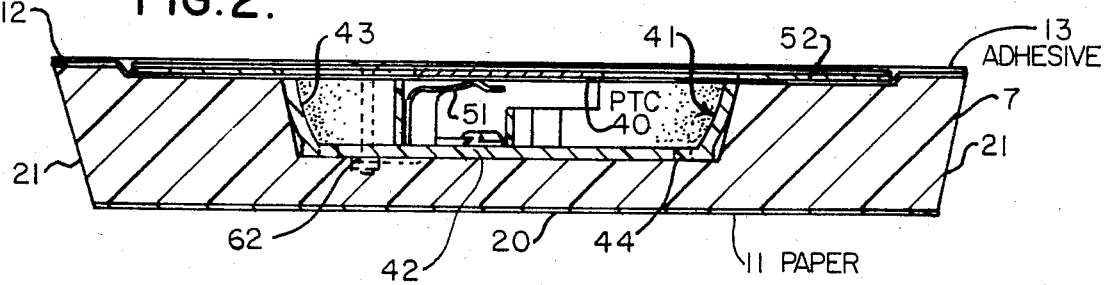
FIG. 3 is a sectional view taken along the line 3—3 of FIG. 2.
Figure 4:
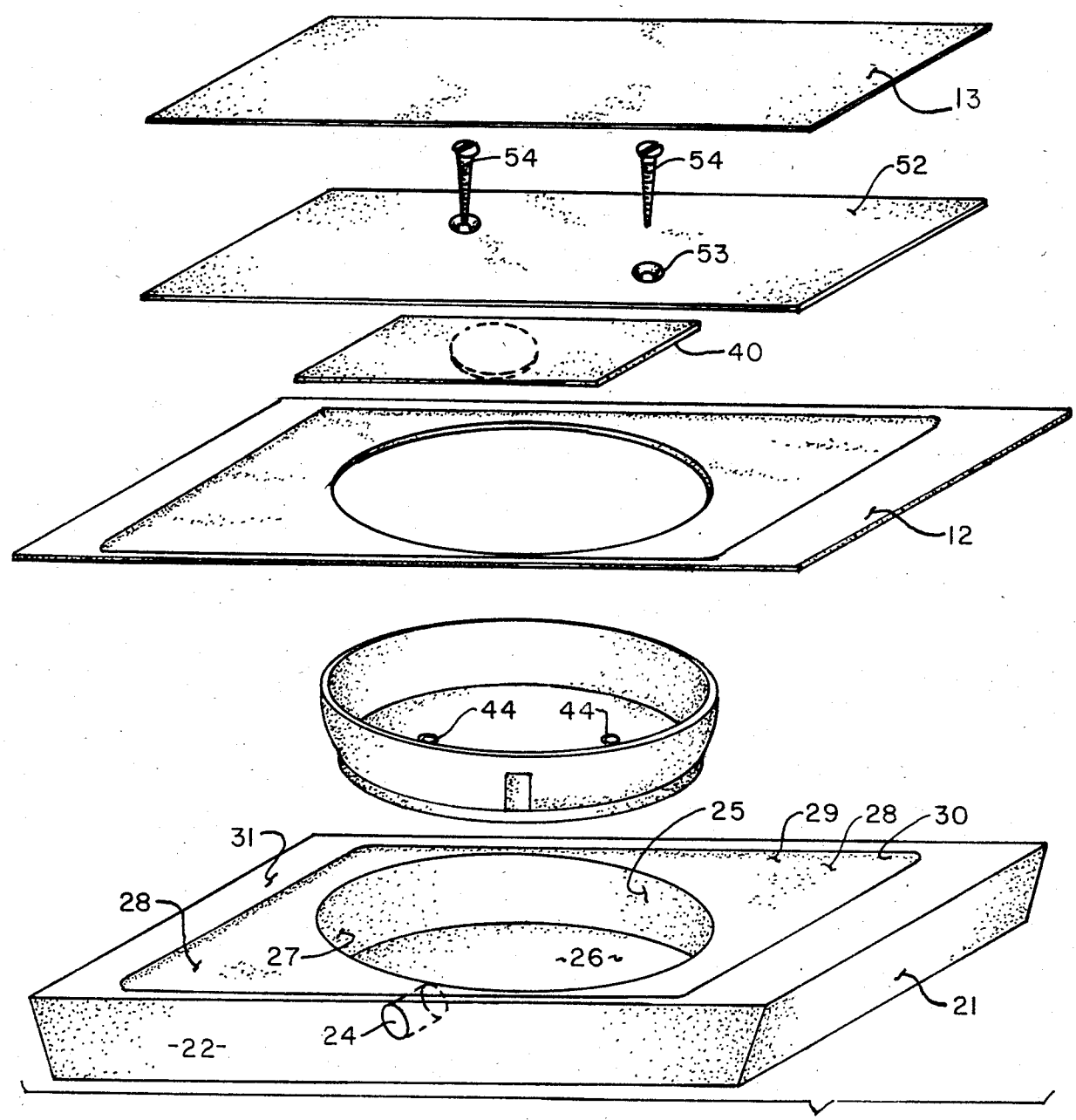
FIG. 4 is an exploded view in perspective of the device shown in FIG. 3 without the PTC heater element or its electrical cord.

The heating assembly 8 includes a PTC element 40, mounted in a cup 41. The cup 41 has a bottom 42 and a side wall 43, and opens upwardly. The bottom 42 has screw holes 44 in it. The PTC element is electrically connected to conductors 49, passing through the passage 24, which are connected at one end to a male plug 50 and at their other, to spring contacts 51 which hold the PTC element 40 in snug contact with an undersurface of the plate 52. The plate 52 has holes 53 which align with the screw holes 44 in the bottom of the cup when the plate is properly positioned, and the plate cup and PTC element are held together by screws 54 extending through the holes 53 and into the screw holes 44. In this embodiment, no provision for grounding is described. However, as indicated in FIGS. 2 and 3, in the second embodiment, one of the screws 54 is a bolt, extending through a suitable hole 44, to which a ground wire 69 is attached by means of a nut 62. A similar arrangement can be used with the first embodiment, if desired.

In the first embodiment being described, the entire upper surface, that is the top of the plate 52 and the top surface 31, are covered with an uninterrupted film 13 of pressure-sensitive adhesive, which forms a continuous covering, serves to hold the plate 52 in place, and, when the warmer is installed on a battery, mounts the warmer to a flat surface of the battery. The adhesive film 13 is overlain by a strippable cover sheet 14 that is removed when the warmer is to be mounted on the flat side of the battery.

Figure 9:
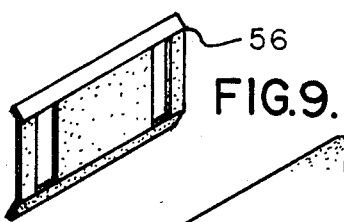
FIG. 9 is a slightly enlarged view in perspective of a strap adjusting slide shown in use in FIG. 8.
Figure 8:
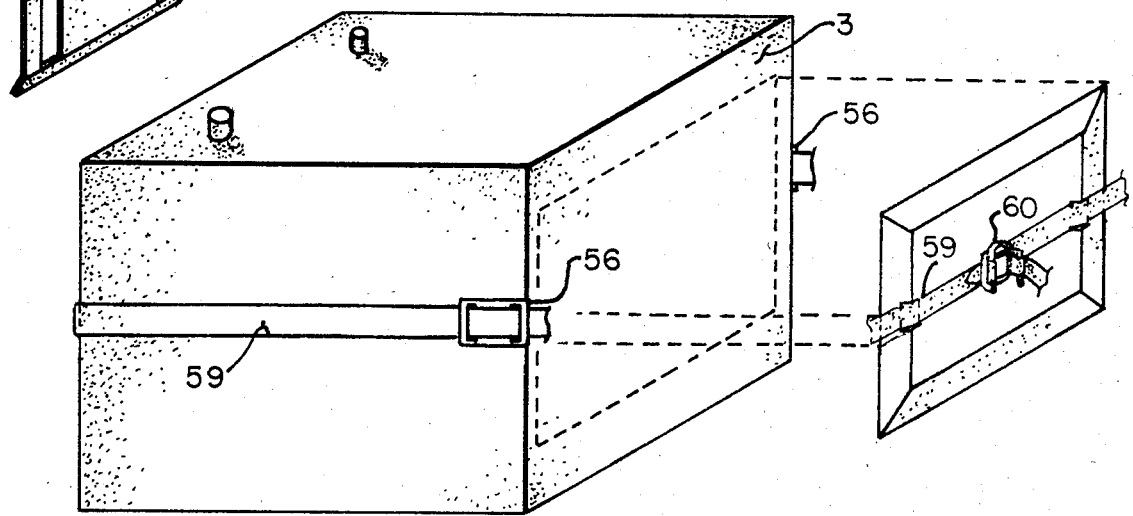
FIG. 8 is a view in perspective showing the mounting arrangement of the embodiment of warmer shown in FIGS. 6 and 7.

Referring now to FIGS. 6 through 9 for a second embodiment, a warmer 101 is identical to the warmer 1 except that, as has been explained above, there is provision for grounding, and that strap-locating recesses 55 are provided in the bottom surface 20 on the two short sides of the body, the upper surface of the top sheet 12 through the surface area of the recess bottom 29 of the body 7 is covered with contact cement by which the plate 52 is secured to the paper within the recess 28, and no adhesive film or cover sheet is provided over the upper surface of the plate. In this embodiment, a strap 59, with a buckle 60, encircles the battery and warmer, mechanically securing the warmer with the plate 52 against the flat side of the battery. Slides 56, shown particularly in FIG. 9, are preferrably provided, mounted on the strap on both sides of the battery, as shown in FIG. 8. In use, the slides are positioned initially along the sides of the battery spaced away from the edges of the battery adjacent the warmer. After the strap has been tightened manually, the slides are moved to a position slightly beyond the edge of the battery, as indicated in FIG. 8, to tighten the strap even more. As can be seen from FIGS. 8 and 9, the slides are provided with long edges bent toward the battery at an angle of about 45°. When the slides are moved slightly beyond the edge of the battery, the slides both cock slightly toward one another and the long edges dig into the battery case sufficiently to prevent unwanted vertical shifting of the strap and, because the strap extends within the strap-locating recesses 55, of the warmer.

Figure 5:
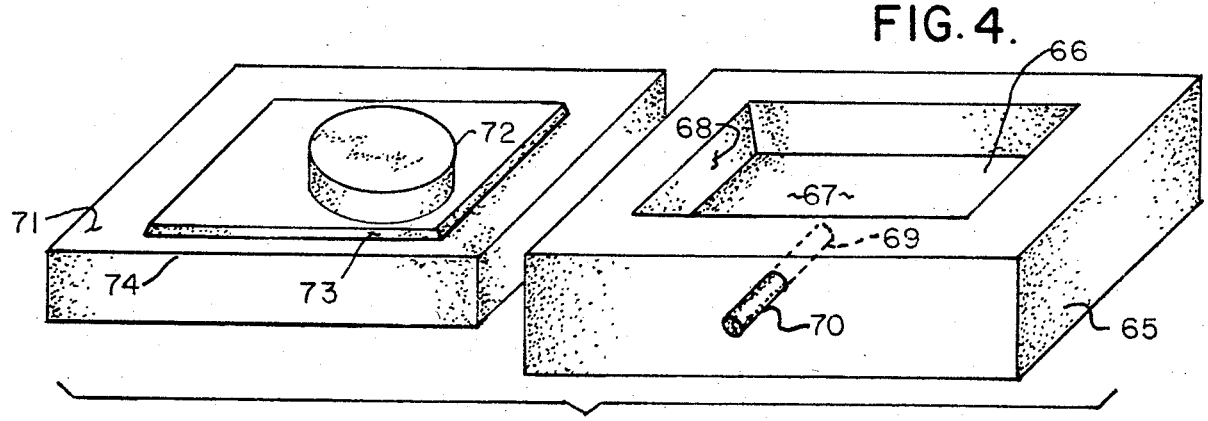
FIG. 5 is a view in perspective of a mold for use in making a housing part of the device of this invention.
Figure 6:
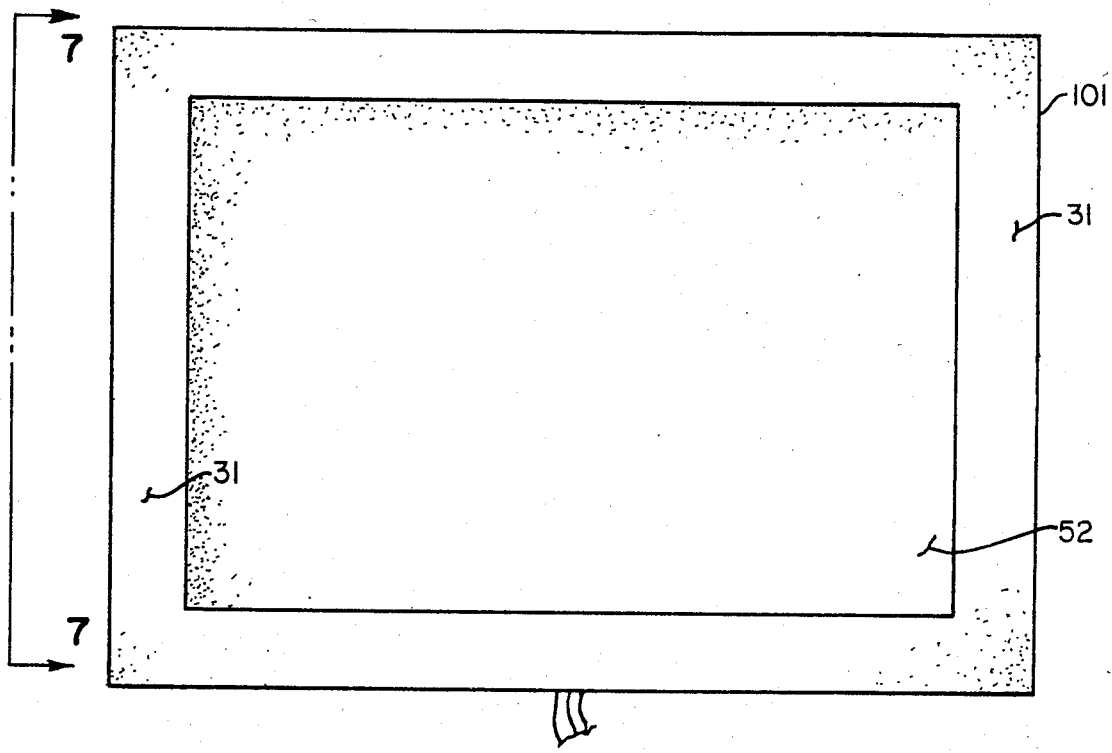
FIG. 6 is a top plan view of another embodiment of warmer of this invention.
Figure 7:
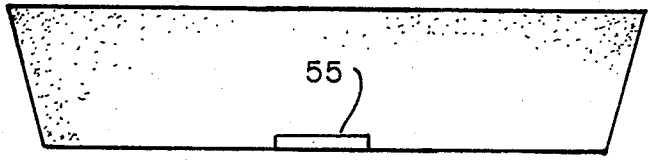
FIG. 7 is a view in side elevation along the line 7—7 of FIG. 6.

Referring now to FIG. 5, reference numeral 65 indicates a mold with a cavity 66 defined by a bottom 67 and upwardly outwardly tending side walls 68. A passage 69 leading through a wall of the mold 65 and opening into the cavity 66 receives a side core 70. A top core lid 71 has a central plug 72 in the form of a shallow truncated cone converging in a direction away from the top, a raised surface 73, and an outer frame surface 74.

In making the warmer of this invention, the surfaces defining the mold cavity 66 are sprayed with a release agent such as silicone, and the bottom sheet 11, with the printing down, is put in the cavity, closely fitting and covering the bottom surface 67. The plug 72 is also sprayed with release agent, and a top sheet 12, which has an opening in it that closely fits the base of the plug 72, is mounted around the plug, covering the upper surface of the top core lid within the ambit of the side walls 68 of the mold cavity. A mixture of uncured polyurethane and intumescing agent are put in the mold cavity, the core lid is mounted securely on the mold, with the plug 72 projecting within the mold cavity, the side core 70 is pushed in until it butts against the side wall surface of the plug 72, and the polyurethane is caused to intumesce and set. The side plug 70 is withdrawn and the core lid is removed. Because no silicone or other release agent is on the surfaces of the bottom and top sheets that are contacted by the polyurethane as it forms the body, the top and bottom sheets are molded into and bonded to the polyurethane tightly. The top and bottom sheets inhibit warping of the molded body, providing a flat surface to face and engage the flat surface of the battery. The top sheet is forced to follow the contour of the raised portion 73 and frame surface 74, leaving a recess, as shown particularly in FIG. 3, within which the plate 52 is mounted.

The conductors 49 can be soldered or otherwise secured to the spring contacts 51, at one end, and led through a hole in the side of the cup. In the first embodiment, the PTC element 40 and plate 12 are then mounted, with the spring contacts 51 holding the element 40 against the underside of the plate, by means of the screws 54. In the second embodiment, the PTC element 40 and plate are mounted by means of screws 54, one of which is a grounding bolt, to which the ground conductor 69 is mounted by means of the nut 62. In both embodiments, the conductors, in a cord, are led through the passage 24, and the plate mounted as shown in FIGS. 2 and 3. The plug 50 can then be connected to the ends of the conductors 49.

In the first embodiment the film of adhesive, already on one side of the cover sheet, can be put on the upper surface by laying the device, upper surface down, on a continuous strip of cover sheet, with its adhesive side up, and then cutting the strip at the edge of the device. When the device is to be mounted on a battery, the flat side 3 of the battery is cleaned, the cover sheet is removed, and the device is mounted by putting it, adhesive side forward, onto the side 3.

In the second embodiment, adhesive can be applied to the upper surface of the sheet 12 within the recess 28, or to the underside of the plate, to mount the plate within the recess.

The conductors are preferably led through an opening in the automobile grille, and attached to it by means of a bag tie or the like. When it is desired to operate the warmer, the tie is removed, and the electric cord housing the conductors extended far enough to permit plugging the terminals of the plug 50 into a complementary electric fitting.

In the case of the second embodiment, the core lid 71 will have bosses complementary to the recesses 55. The recesses serve as guides or locaters, and inhibit up and down movement of the warmer with respect to the battery after the device is strapped to the battery. The second embodiment is designed to meet UL standards.

Merely by way of illustration, the PTC element may be a barium titanate element of the type used in cup warmers of my Pat. Nos. 3,778,594 and 4,160,152, for use with 120 V AC, to provide a temperature in the range of 45° to 100° F. in ambient temperature of −30° to 75° F. for a standard 12 volt lead-acid automobile storage battery. When the ambient gets above 80°, the PTC element has decreasing heating effect as the ambient approaches the critical cut-off temperature of the element.

The battery warmer of this invention can be packaged attractively in a skin package, with the plate side of the warmer toward a cardboard sheet on which a picture of a battery is printed, to simulate closely the actual installed appearance of the warmer on the vehicle battery for which it is intended and the paper bearing the instructions facing out, the electric cord being coiled adjacent the warmer and held in coil form by a tie that can be used to mount the cord with the plug extending through the grill of a vehicle, and the whole encased in a skin of transparent plastic, so that the instructions can be read through the plastic cover.

Numerous variations in the construction of the device of this invention, within the scope of the appended claims, will occur to those skilled in the art in the light of the foregoing disclosure. Merely by way of example, the top surface of the molded body can extend beyond the upwardly extending side surfaces to form an overhanging lip the flexiblity of which is an aid to the tight securement around the edges of the body to the battery. The housing can be of different shape in plan. The transparent plastic cover can be a blister or shrink pack. These are merely illustrative.

I claim:

1. A battery warmer for warming a vehicle battery having a flat side, said battery being in a vehicle compartment, said warmer comprising a molded block of polyurethane foam having a flat bottom surface, a top surface with a heater-receiving well, and side surfaces extending from the edges of said bottom surface to the outer margins of said top surface; a PTC heater element mounted in said well; a metal plate, connected in heat transfer relation to said PTC element and extending in substantially flush relation to said upper surface; electrical means for connecting said PTC element to a source of electric current, and means for mounting said warmer to said flat side of said battery, said mounting means comprising a strap embracing said battery and said warmer and slides, mounted on said strap on both sides of the battery, for sliding toward the said warmer beyond the edge of the battery adjacent the said warmer to tighten the strap after it has been first tightened manually, opposite of said side surfaces of said molded block and said bottom surface defining at their respective arris a notch, said notches being aligned and receiving said strap.

2. A battery warmer for warming a vehicle battery having a flat side, said battery being in a vehicle compartment, said warmer comprising a molded block of polyurethane foam having a flat bottom surface, a top surface with a heater-receiving well, and side surfaces extending from the edges of said bottom surface to the outer margins of said top surface; a PTC element mounted in said well; a metal plate, connected in heat transfer relation to said PTC element and extending in substantially flush relation to said upper surface; electrical means for connecting said PTC element to a source of electric current, and means for mounting said warmer to said flat side of said battery, said mounting means comprising a strap embracing said battery and said warmer and slides, mounted on said strap on both sides of the battery, for sliding toward said warmer beyond the edge of the battery adjacent the said warmer to tighten the strap after it has been first tightened manually, said slides having long edges bent toward said battery, said edges digging into said battery when said slides are moved slightly beyond the edges of the battery.

* * * * *